United States Patent
Fredericks et al.

(10) Patent No.: US 6,564,883 B2
(45) Date of Patent: May 20, 2003

(54) RIB-MOUNTED LOGGING-WHILE-DRILLING (LWD) SENSORS

(75) Inventors: Paul Fredericks, Kingwood, TX (US); Donald MacCallum, Woodlands, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/727,929

(22) Filed: Nov. 30, 2000

(65) Prior Publication Data

US 2002/0062992 A1 May 30, 2002

(51) Int. Cl.⁷ ............................................. E21B 47/00
(52) U.S. Cl. ................... 175/50; 175/45; 166/250.01; 73/152.17; 73/152.46
(58) Field of Search .................. 175/40, 45, 50; 166/250.01, 254.2; 73/152.03, 152.17, 152.46

(56) References Cited

U.S. PATENT DOCUMENTS

| | | | |
|---|---|---|---|
| 4,904,865 A | 2/1990 | Meisner et al. ............ 250/254 |
| 5,242,020 A | * 9/1993 | Cobern | |
| 5,354,956 A | * 10/1994 | Orban et al. ................ 181/105 |
| 5,836,406 A | 11/1998 | Schuh ......................... 175/61 |
| 6,026,915 A | * 2/2000 | Smith et al. .................. 175/50 |
| 6,179,066 B1 | * 1/2001 | Nasr et al. .................... 175/45 |
| 6,230,557 B1 | * 5/2001 | Ciglenec et al. ......... 72/152.01 |

FOREIGN PATENT DOCUMENTS

| | | |
|---|---|---|
| GB | 2334982 A | 9/1999 |
| WO | WO99/45234 | 9/1999 |

\* cited by examiner

Primary Examiner—David Bagnell
Assistant Examiner—Jennifer Dougherty
(74) Attorney, Agent, or Firm—Madan, Mossman & Sriram, P.C.

(57) ABSTRACT

A Logging-while-Drilling method and apparatus for obtaining information about a formation uses a plurality of rib sets with pad-mounted sensor on one or more selectively non-rotating sleeves attached to a rotating housing that is part of a drilling assembly. The sensors may be density, neutron, NMR, resistivity, sonic, dielectric or any number of other sensors. In an alternative arrangement, the sensors rotate with the drill string.

24 Claims, 11 Drawing Sheets

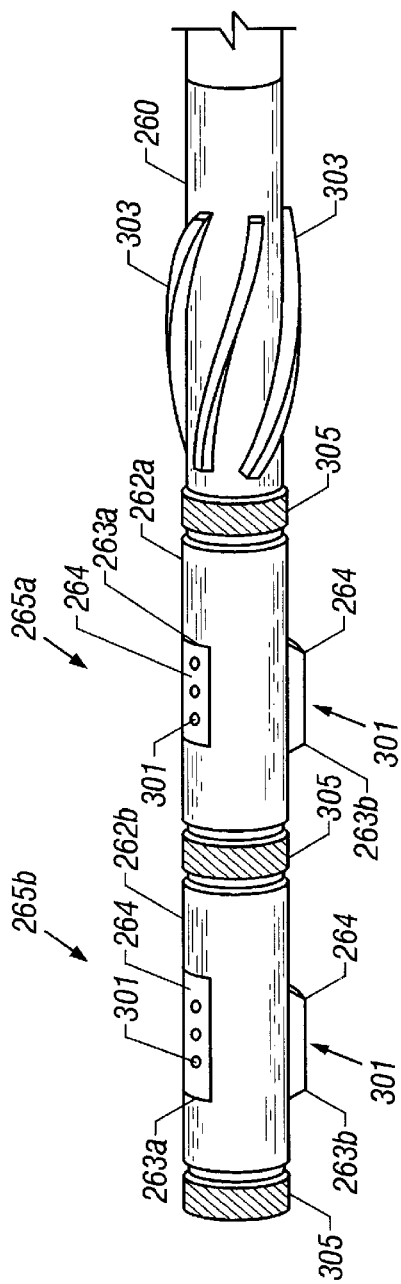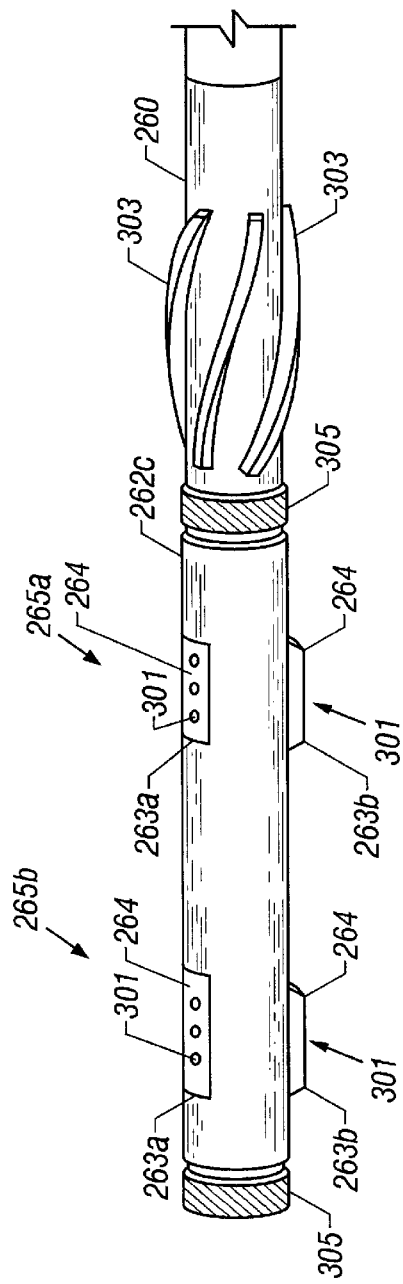

FIG. 3D  FIG. 3E

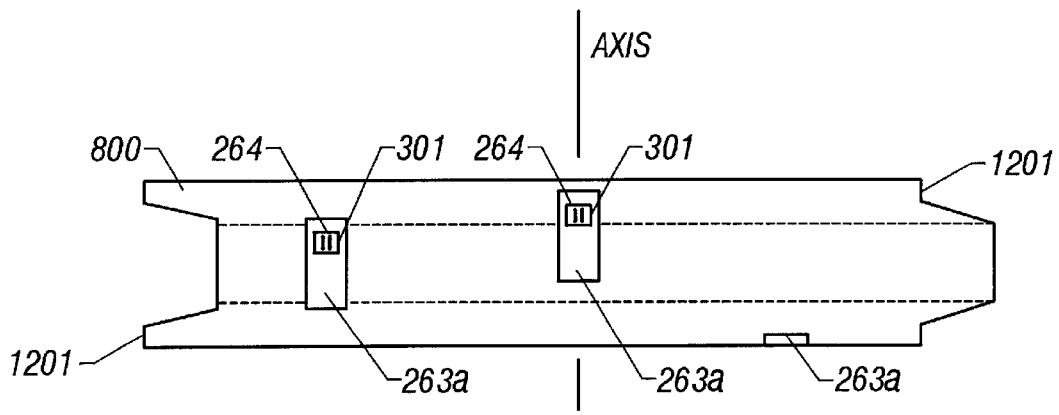
FIG. 3K
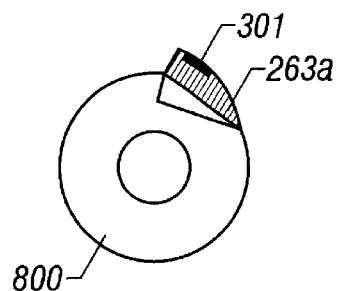 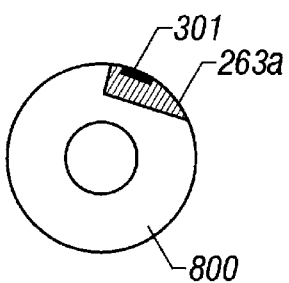
FIG. 3L  FIG. 3M

RIB-MOUNTED LOGGING-WHILE-DRILLING (LWD) SENSORS

FIELD OF THE INVENTION

This invention relates to the acquisition and processing of data acquired by a logging-while-drilling (LWD) tool during the drilling of a well borehole. More particularly, the invention relates to methods and devices for acquiring data downhole using sensors in contact with the borehole wall, processing the data and transmitting to the surface, in real-time, parameters of the formation penetrated by the borehole as the borehole is being drilled using LWD telemetry.

BACKGROUND OF THE INVENTION

Modern well drilling techniques, particularly those concerned with the drilling of oil and gas wells, involve the use of several different measurement and telemetry systems to provide petrophysical data and data regarding drilling mechanics during the drilling process. Data are acquired by sensors located in the drill string near the bit and either stored in downhole memory or transmitted to the surface using LWD telemetry devices.

A downhole device incorporating resistivity, gravity and magnetic measurements on a rotating drillstring is known in the art. A downhole processor uses the gravity and magnetic data to determine the orientation of the drill string, and using measurements from the resistivity device, makes measurements of formation resistivity at time intervals selected to give measurements spaced around the borehole. These data are compressed and transmitted uphole by a mud pulse telemetry system. The depth of the resistivity sensor is computed at the surface and the data are decompressed to give a resistivity image of the face of the borehole wall with an azimuthal resolution of 30° or better.

Methods using the known apparatus described above methods are limited to making resistivity measurements in the subsurface and fail to address the issue of other useful measurements that could be made using a logging-while drilling (LWD) device. LWD is similar to methods known as measurement-while-drilling (MWD), and any reference herein to LWD is intended to include MWD, as an alternative embodiment.

The devices described above are also limited to measurement devices that rotate with the drill string and do not take advantage of current drilling methods wherein a mud motor is used and the drill bit could be rotating at a different speed from the drill string or wherein a non-rotating sleeve may be available on which substantially non-rotating measuring devices could be located. The present invention overcomes these inadequacies.

SUMMARY OF THE INVENTION

The present invention is an apparatus and method of making measurements of a plurality of parameters of interest of the formation surrounding a borehole while a drillstring with a bit at an end thereof is drilling the borehole. In one aspect of the invention, a plurality of selectively non-rotating sleeves are mounted on the drillstring. One or more extendable ribs are mounted on each of the sleeves. Pads are coupled to each rib and sensors are coupled to each pad. When the ribs are extended, measurements of the parameters are made as the drillstring advances through the formation.

In another aspect of the invention, each of a plurality of non-rotating sleeves includes one or more non-extendable (fixed) ribs with pad-mounted sensors coupled thereto. The sensors on the fixed ribs include at least one of a neutron sensor and a density sensor. Other additional sensors may also be used.

In another aspect of the invention an extendable rib and a plurality of fixed ribs are disposed about the outside of a non-rotating sleeve to define a rib set. Each rib of the rib set includes a pad and a plurality of sensors coupled thereto. A plurality of rib sets are mounted on a single non-rotating sleeve, or one rib set may be mounted on each of a plurality of nonrotating sleeves.

In another aspect of this invention, an extendable rib or plurality of extendable ribs are disposed the outside of a subassembly (or sub) that is part of the drill string. As the drillstring rotates the ribs rotate. Each rib contains a pad and a plurality of sensors. The subassembly is provided with sensors that enable the relative position of each rib to be determined with reference to a direction or gravitational orientation.

In another aspect of the invention, the drill bit is mounted on a rotating drillstring and the downhole assembly is provided with sensors that rotate with the drillstring to make measurements of the parameters of interest. The assembly is provided with magnetic, gravitational and/or inertial sensors to provide information on the orientation of the measurement sensors. A telemetry system sends information downhole about the depth of the drilling assembly. A processor downhole combines the depth and azimuth information with the measurements made by the rotating sensors, uses redundancy in the data to improve S/N ratio, compresses the data and sends it uphole by a telemetry system or stores it downhole for later retrieval.

In another aspect of the invention, the drill bit is driven by a downhole drilling motor. The motor may be on a rotating drillstring or on coiled tubing. The sensors for measuring the parameters of interest could be rotating with the drill bit. Alternatively, the sensors could have one of several configurations. In one configuration, the sensors are mounted on a substantially non-rotating sleeve; in another configuration, the sensors are mounted on pads and the pads are coupled to ribs that could be rotating or non-rotating, the pads being hydraulically or mechanically actuated to make contact with the borehole wall. In any of these arrangements, the downhole assembly is provided with sensors that make measurements of the parameters of interest. The assembly is provided with magnetic, gravitational and/or inertial sensors to provide information on the orientation of the measurement sensors. A telemetry system sends information downhole about the depth of the drilling assembly. A microprocessor downhole combines the depth and azimuth information with the measurements made by the rotating sensors, uses redundancy in the data to improve S/N ratio, compresses the data and sends it uphole by a telemetry system. The parameters of interest include resistivity, density, compressional and shear wave velocity and structure, dipmeter, dielectric constant, acoustic porosity, NMR properties and seismic images of the formation.

In another aspect of the invention, the drill bit is adapted to function as a resistivity sensor. A current is generated by a first toroid. The current flows through the tool assembly, drill bit and formation. Current in a second toroid is generated by the current flowing through the tool and a resistivity is determined from current in the second toroid.

As a backup to, or independently of, obtaining the depth information by downhole telemetry, the present invention also provides a capability in the downhole microprocessor to use measurements from sensors at more than one depth to provide a rate of penetration. Surface-measured depths can also be integrated with the measurements from the sensors using a surface mounted depth tracking system on a drilling rig.

BRIEF DESCRIPTION OF THE FIGURES

FIG. 3A illustrates an arrangement wherein each of two independent non-rotating sleeves includes a rib set comprising an extendable rib and one or more fixed ribs.

FIG. 3B illustrates an arrangement wherein a single non-rotating sleeve includes two rib sets, each rib set comprising an extendable rib and one or more fixed ribs.

FIGS. 3D–3E illustrate alternative arrangements of resistivity sensors on a pad.

FIG. 3K shows an alternative embodiment of the present invention.

FIGS. 3L–3M are cross section views of the tool of FIG. 3K.

DETAILED DESCRIPTION OF THE INVENTION

Figure 1:
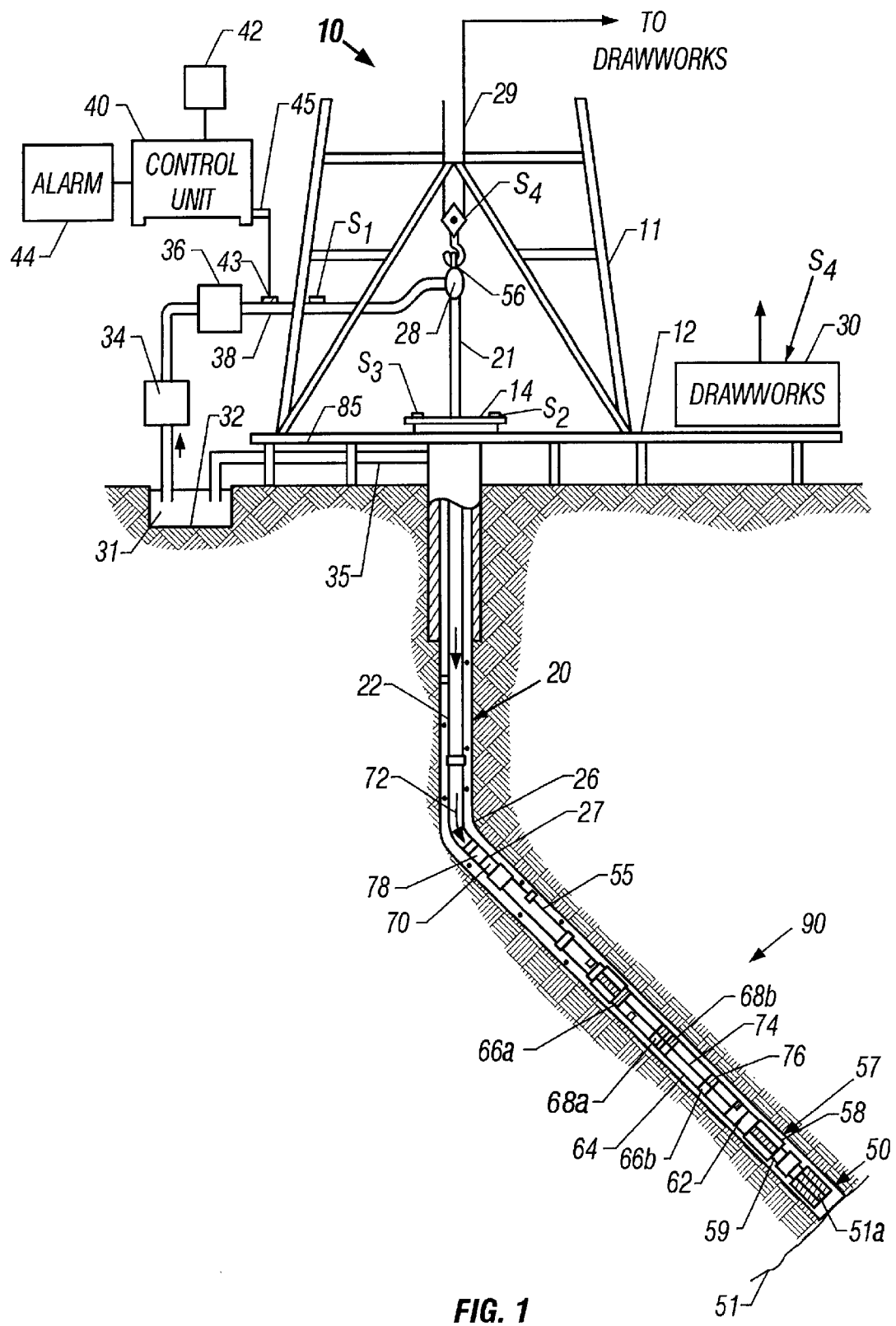
FIG. 1 is a schematic illustration of a drilling system.

FIG. 1 shows a schematic diagram of a drilling system 10 having a drilling assembly 90 shown conveyed in a borehole 26 for drilling the wellbore. The drilling system 10 includes a conventional derrick 11 erected on a floor 12 which supports a rotary table 14 that is rotated by a prime mover such as an electric motor (not shown) at a desired rotational speed. The drill string 20 includes a drill pipe 22 extending downward from the rotary table 14 into the borehole 26. The drill bit 50 attached to the end of the drill string breaks up the geological formations when it is rotated to drill the borehole 26. The drill string 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks 30 is well known in the art and is thus not described in detail herein. A depth tracking system S4 is well known in the art and is shown coupled to the drawworks 30.

During drilling operations, a suitable drilling fluid 31 from a mud pit (source) 32 is circulated under pressure through the drill string by a mud pump 34. The drilling fluid passes from the mud pump 34 into the drill string 20 via a desurger 36, fluid line 38 and Kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. A sensor $S_1$ preferably placed in the line 38 provides information about the fluid flow rate. A surface torque sensor $S_2$ and a sensor $S_3$ associated with the drill string 20 respectively provide information about the torque and rotational speed of the drill string. Additionally, a sensor (not shown) associated with line 29 is used to provide the hook load of the drill string 20.

In one embodiment of the invention, the drill bit 50 is rotated by only rotating the drill pipe 52. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

The mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. The drilling sensor module processes the sensor information and transmits it to the surface control unit 40 via a suitable telemetry system 72.

Figure 2:
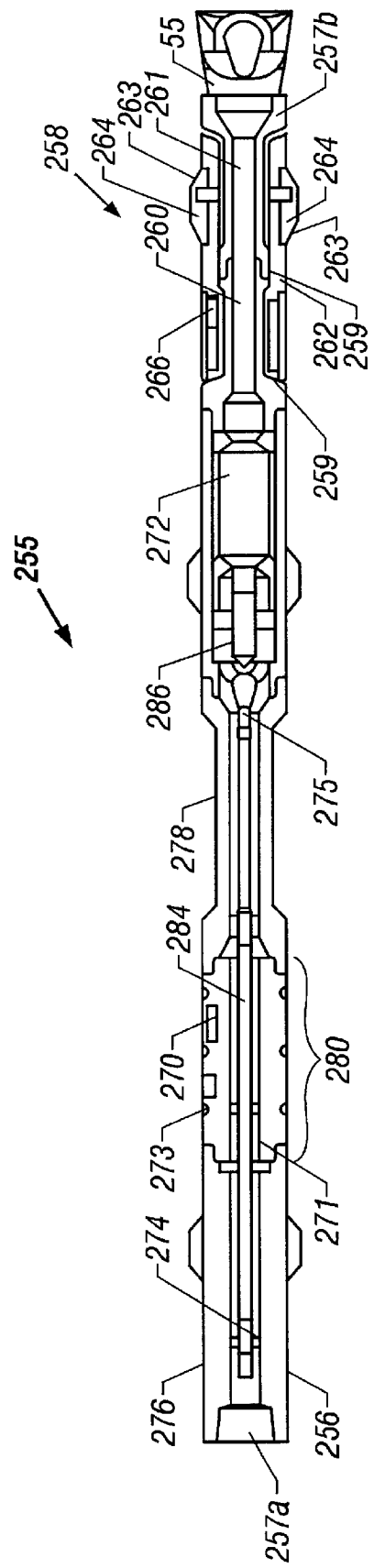
FIG. 2 illustrates a drilling assembly for use with a surface rotary system for drilling boreholes wherein the drilling assembly has a non-rotating sleeve for effecting directional changes downhole.

FIG. 2 shows a schematic diagram of a rotary drilling assembly 255 conveyable downhole by a drill pipe or coiled tube (not shown). The drilling assembly 255 includes a device for changing drilling direction without stopping the drilling operations for use in the drilling system 10 shown in FIG. 1. The drilling assembly 255 has an outer housing 256 with an upper joint 257a for connection to the drill pipe (not shown) and a lower joint 257b for accommodating the drill bit 55. During drilling operations, the housing 256, and thus the drill bit 55, rotate when the drill pipe is rotated by the rotary table at the surface. The lower end 258 of the housing 256 has reduced outer dimensions 258 and bore 259 therethrough. The reduced-dimensioned end 258 has a shaft 260 that is connected to the lower end 257b and a passage 261 for allowing the drilling fluid to pass to the drill bit 55. A selectable non-rotating sleeve 262 is disposed on the outside of the reduced dimensioned end 258, in that when the housing 256 is rotated to rotate the drill bit 55, the non-rotating sleeve 262 remains in its position when selected (engaged) or rotates with the housing 256 when not selected (disengaged). There are several mechanisms known in the art for engaging and disengaging a tool member and thus not shown or described in detail herein. One or more independently adjustable extendable ribs 263a are disposed on the outside of the non-rotating sleeve 262. Each extendable rib 263a is preferably hydraulically operated by a control unit in the drilling assembly 255. Those versed in the art would also recognize that these ribs, because they are provided with the ability for selectively extending or retracting during drilling operations, can also be used as stabilizers and for controlling the drilling direction. Mechanisms for extending the ribs 263a could be operated by hydraulic, mechanical or electrical devices. Furthermore, the extendable ribs 263a may be biased in an extended or in a retracted position. A commonly used mechanical biasing arrangement is to have the extendable ribs mounted on springs that keep the extendable ribs biased in an extended or retracted position. Such devices would be familiar to those versed in the art.

Also disposed on the sleeve 262 are one or more fixed ribs 263b. The term "fixed" as used herein with respect to ribs 263b is defined as being mounted in a substantially immovable relationship in a radial direction with respect to the sleeve 262. In a preferred embodiment there are two fixed ribs 263b and one extendable rib 263a making a rib set 265. The ribs 263a and 263b comprising the rib set 265 are located on the sleeve 262 at substantially the same distance along the longitudinal axis of the sleeve and each rib is spaced substantially equally about the circumference of the sleeve 262 from other ribs in the set 265. In preferred embodiments to be discussed in detail hereinafter, there are at least two rib sets disposed on the drilling assembly 255.

Each rib 263a and 263b includes a pad 264 for making contact with the borehole wall. A plurality of formation sensors (not shown) is located on each of the pads 264. Illustrative arrangements of the formation sensors are discussed below in reference to FIGS. 3D–3I.

The drilling assembly 255 also includes a directional sensor 271 near the upper end 257a and sensors for determining the temperature, pressure, fluid flow rate, weight on bit, rotational speed of the drill bit, radial and axial vibrations, shock and whirl. Without limiting the scope of the invention, the directional sensors 271 could be of the magnetic or inertial type. The drilling assembly 255 may include a number of non-magnetic stabilizers 276 near the upper end 257a for providing lateral or radial stability to the drill string during drilling operations in addition to the support provided by the ribs 263a and 263b. A flexible joint 278 is disposed between the section 280 and the section containing the non-rotating sleeve 262. A control unit designated by 284 includes a control circuit or circuits having one or more processors. The processing of signals is performed generally in the manner described below in reference to FIGS. 5A–5B. A telemetry device, in the form of an electromagnetic device, an acoustic devise, a mud-pulse device or any other suitable device, generally designated herein by 286 is disposed in the drilling assembly at a suitable place. A microprocessor 272 is also disposed in the drilling assembly at a suitable location.

Referring now to FIG. 3A, the drilling assembly described above and shown in FIG. 2 preferably includes two rib sets 365a and 365b. FIG. 3A illustrates an arrangement wherein the two rib sets 265a and 265b are coupled to two independent non-rotating sleeves 262a and 262b. Shown are the drilling shaft 260 with two non-rotating sleeves 262a and 262b mounted on the shaft 260. A plurality of ribs 263a and 263b with sensors 301 are attached to each sleeve 262. In an exemplary embodiment, each rib set 265a and 265b comprises a selectively extendable rib 263a and one or more fixed ribs 263b. Each rib 263a and 263b has a pad 264 coupled thereto. Each pad 264 has a sensor 301 for measuring a parameter of interest. The combination of a pad 264 and sensor 301 is also called a pad-mounted sensor. The mechanism for moving the extendable rib 263a out toward the borehole, whether it be hydraulic, a spring mechanism or another mechanism is not shown. In this arrangement, the two non-rotating sleeves 262a and 262b are independently controllable in that each sleeve can be engaged or disengaged without affecting the operation of the other sleeve. Likewise, the selectively extendable rib 263a on one sleeve 262a can be extended or retracted without affecting (or being affected by) the position of the selectively extendable rib 263a coupled to the second sleeve 262b.

In one embodiment, two toroids 305 that are wound with a current carrying conductor (not shown) surround the shaft 260. The toroids are arranged with same polarity, so that upon passage of a current in the toroid 305, a circumferential magnetic field is induced in the two toroids 305. This magnetic field, in turn, induces an electric field along the axis of the shaft 260. The leakage current measured by at least one of the sensors 301 is then a measure of the resistivity of the formation adjacent to the sensors, with the leakage current being substantially radial. Such an arrangement has been used before in wireline logging but has not been attempted before in measurement while drilling applications. The shaft 260 is provided with stabilizer ribs 303 for controlling the direction of drilling.

In a preferred embodiment, the sensors 301 on the extendable rib 263a of the first rib set 265a are resistivity sensor (buttons) while the sensor on at least one of the fixed ribs 263b of the first rib set 265a is a density sensor. The sensors 301 of the second rib set 265b include a neutron sensor on at least one fixed rib 263b and resistivity sensors on the extendable rib 263a.

In an alternative embodiment, all rib-mounted sensors are of the same type. The specific application controls the selection of sensor type. For example, one application may require resistivity sensors while another application requires another sensor technology.

FIG. 3B illustrates an alternative embodiment wherein rib-mounted sensors are coupled to a single non-rotating sleeve 262c. This single-sleeve arrangement provides fixed positioning of the ribs 263a and 263b of the first rib set 265a relative to the ribs 263a and 263b of second rib set 265b. This arrangement provides a simpler design and reduces the need to calculate or measure the position of the sensors 301 relative to each other . The embodiment shown includes a rotatable shaft 260 having a single long non-rotating sleeve 262c coupled to the shaft 260 at a reduced dimensioned section similar to the embodiment described above and shown in FIG. 2. A first rib set 265a comprising a selectively extendable rib 263a is coupled to the sleeve 262c. A pad 264 suitable for maintaining sliding contact with a borehole is coupled to the extendable rib 263a. One or more sensors 301 are operatively associated with the pad 264. The first rib set 265a further includes one or more fixed ribs 263b coupled to the sleeve 262c. The fixed ribs 263b include pads 264 substantially identical to the pad of the extendable rib. Sensors 301 are coupled to the pads 264 of the fixed ribs 263b. These fixed-rib sensors may be the same or different as the sensors on the pads of the extendable rib 263a.

A second rib set 265b is coupled to the single non-rotating sleeve 262c longitudinally spaced apart from the first rib set 265a. The second rib set 265b includes a selectively extendable rib 263a coupled to the sleeve 262c. A pad 264 suitable for maintaining sliding contact with a borehole is coupled to the extendable rib 263a. One or more sensors 301 are operatively associated with the pad 264. The second rib set 265b further includes one or more fixed ribs 263b coupled to the sleeve 262c. The fixed ribs 263b include pads 264 substantially identical to the pad of the extendable rib. Sensors 301 are coupled to the pads 264 of the fixed ribs 263b. These fixed-rib sensors may be the same or different as the sensors on the pads of the extendable rib 263a.

In a preferred embodiment, the sensors 301 on the extendable rib 263a of the first rib set 265a are resistivity sensor (buttons) while the sensor on at least one of the fixed ribs 263b of the first rib set 265a is a density sensor. The sensors 301 of the second rib set 265b include a neutron sensor on at least one fixed rib 263b and resistivity sensors on the extendable rib 263a.

When extended, the extendable ribs 263a in the embodiments described above and shown in FIGS. 3A and 3B may function as steering members or stabilizers, although stabilizers 303 may be coupled to the shaft 260 to aid in stabilizing the shaft during drilling operations. In the illustrative embodiment of FIG. 3B, one or more current carrying toroids 305 are operatively coupled to the shaft 260 at the reduced dimensioned section to produce an electric field that operates in the same manner as in the discussion above with respect to FIG. 3A.

Figure 3C:
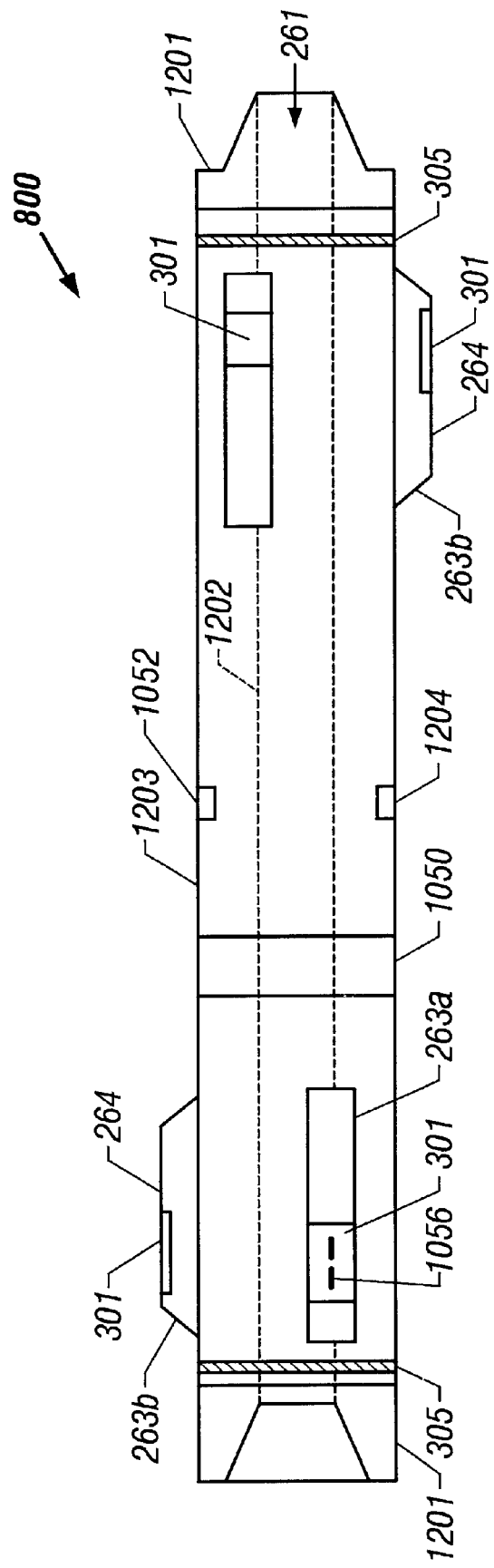
FIG. 3C illustrates an alternative embodiment of the single non-rotating sleeve arrangement of FIG. 3B.

FIG. 3C illustrates and alternative embodiment of the single non-rotating sleeve arrangement of FIG. 3B. Shown is a subassembly or ("sub") 800 suitable for operation with a rotary drilling assembly such as described above and shown in FIG. 2. The sub 800 is conveyable downhole by drill pipe (not shown). A typical drillpipe compatible connection 1201 is coupled to each end of the sub 800. Each connector is adapted for the transfer of power and data between the sub 800 and components located elsewhere along the drilling assembly. An external power source (not shown) is preferably used with this arrangement to provide power to the sub 800. This source can be either the rotary drilling assembly or a separate LWD assembly.

The sub 800 includes a reduced dimension shaft 1202, between the connections 1201. A passage 261 allows drilling fluid to flow internally through the sub 800 from a drillpipe connected at the connection 1201. A selectively non-rotating sleeve 1203 is coupled to the shaft 1202. The sleeve 1203 is substantially identical to the non-rotating sleeve described above and shown in FIG. 3B. A plurality of rib sets 265a and 265b are mounted on the sleeve 1203. The rib sets 265a and 265b are substantially identical to the rib sets described above and shown in FIGS. 3A and 3B. Each rib set comprises an extendable rib 263a having a pad 264 and a plurality of sensors 301 mounted thereon. Each rib set 265a and 265b also includes one or more fixed ribs 263b, wherein each fixed rib 263b includes a pad 264 and sensors 301. Two toroids 305 are disposed on the sleeve 1203 at suitable locations near the joints 1201. Each toroid is wound with a current carrying conductor (not shown) such that current flowing in a toroid is measured by one or more of the sensors 301.

The pads 264 can contain a plurality of formation evaluation sensors mounted on each pad in addition or separate to the sensors that could measure the current field generated by the toroids. The pads 264 coupled to the extendable ribs 263a can be extended to contact the borehole wall by various hydraulic or mechanical devices either automatically or on command from an external source, or the extendable ribs 263a may be retracted so that the pads 264 do not contact the borehole wall.

The sub 800 includes communication, data processing and transfer software and electronic hardware not shown in the figure. These components may be located on the sleeve 1203 of at any suitable location on the sub 800. The software/hardware includes a storage device to store raw, or processed data for later independent access by external computers. The sub 800 further includes software and hardware for performing self diagnostic routes to determine the correct performance of the sub.

The ribs 263a and 263b are coupled to the sleeve in a detachable relationship to allow for easy reconfiguration of sensors 301. The sensors 301 can be removed from the corresponding pad 264 for inspection and repair or replacement with other sensors.

FIG. 3C shows a particularly useful configuration wherein two rib sets 265a and 265b are separated from each other along a non-rotating sleeve 1203. The ribs of the first set 265a are offset with respect to the ribs of the second set 265b as shown. This configuration enables imaging around-the-borehole. Additional sensors like laterolog type resistivity and circumferentional borehole acoustic imaging mounted to the sleeve 1203 in a suitable location 1204 such as between the two rib sets 265a and 265b. Pad orientation is determined using sensors and a processor (not shown) as described above and shown in FIG. 2 to provide azimuthal and borehole orientation data.

An alternative arrangement to this configuration is the addition of a mechanism that allows the non rotating sleeve 1203 to rotate with the shaft 1202 at relative speeds ranging from non-rotating to rotating at the same speed as the shaft.

Still referring to FIG. 3C, the sub 800 may include electromagnetic induction sensors used to determine the resistivity of the formation. An electromagnetic transmitter antenna 1050 is used to induce an electromagnetic signal into the formation. The antenna 1050 is coupled to the non-rotating sleeve 1203. One or more sensors 301 are selected from known electromagnetic receiver modules. The electromagnetic sensors 301 are coupled to the extendable rib 263a of at least one rib set 265b. Each electromagnetic receiver module 301 has a plurality of slots 1056 behind which receiver coils (not shown) are disposed. The slots are axially spaced apart so that measurements may be made from at least two transmitter to receiver distances. The antenna 1050 is controlled by an electronics module 1052 disposed at a suitable location. Using known electromagnetic induction logging methods, the transmitter sends out a pulse at a frequency and the amplitude and phase of the signal received by the receivers in the receiver modules is used to determine the resistivity of the formation. The frequency of the transmitted signal is typically between 1 MHz and 10 MHz. With the azimuthally disposed arrangement of the extendable ribs 263a and the receiver modules 301 on the ribs 263a, this embodiment makes it possible to determine an azimuthal variation of resistivity. When multiple frequency signals are used, both the resistivity and the dielectric constant of the formation may be determined using known methods. The sensor configuration just described and shown in FIG. 3C may also be used with the embodiments described above and shown in FIGS. 3A and 3B.

In another embodiment of the invention, induction measurements are obtained using an electrode arrangement according to FIG. 3D. For example, referring to FIG. 3D, the electrodes 301aa, 301ab could be used as a transmitter when pulsed simultaneously, as could the electrodes 301da,301db. Similarly, the electrodes 301ba, 301bb constitute one receiver while the electrodes 301ca, 301cb constitute a second receiver.

FIGS. 3D and 3E illustrate alternative arrangements for a plurality of resistivity sensors on a single pad 264. The electrodes are arranged in a plurality of rows and columns. In FIG. 3D, two columns and four rows are shown, with the electrodes identified from 301aa to 301db. In FIG. 3E, four rows of electrodes 301ca–301fc are shown. Each row is offset with the rows above and below it by, for example, one half the distance separating the electrodes along a row. In a typical arrangement, the electrodes would be an inch apart. Having a plurality of columns increases the azimuthal resolution of resistivity measurements while having a plurality of rows increases the vertical resolution of resistivity measurements.

Figure 3F:
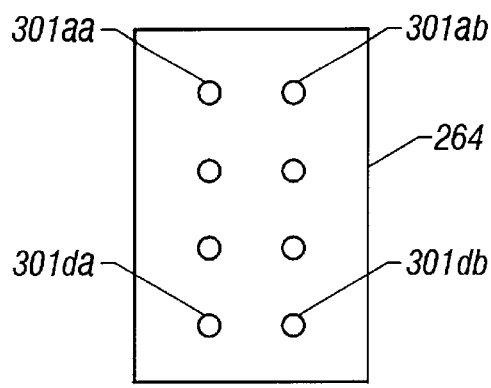
FIG. 3F illustrates the overlap between pads on a rotating sensor arrangement.
Figure 3F:
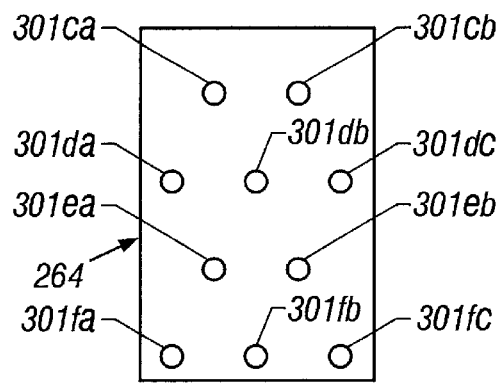
Figure 3F:
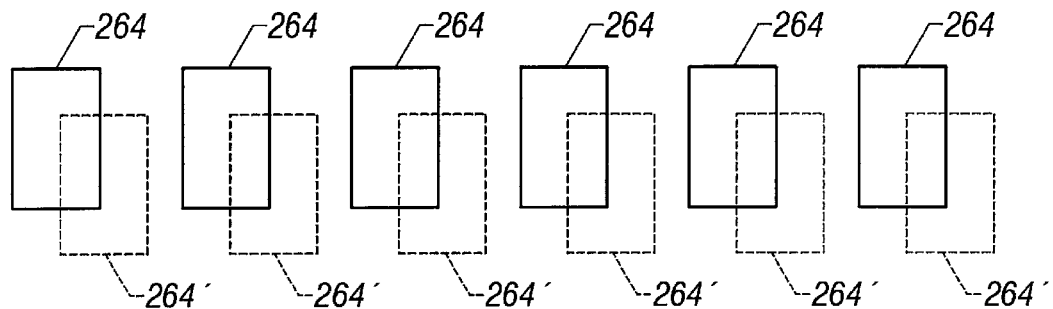

FIG. 3F illustrates how a plurality of pads, six in this case, can provide resistivity measurements around the borehole. In the figure, the six pads are shown as 264 at a particular depth of the drilling assembly. For illustrative purposes, the borehole wall has been "unwrapped" with the six pads spread out over 360° of azimuth. As noted above, the pads are on arms that extend outward from the tool body to contact the wall. The gap between the adjacent pads will depend upon the size of the borehole: in a larger borehole, the gap will be larger. As the drilling proceeds, the tool and the pads will move to a different depth and the new position of the pads is indicated by 264'. As can be seen, there is an overlap between the positions of the pads in azimuth and in depth. The tool orientation is determined by the microprocessor 272 from the directional sensors 271. This overlap provides redundant measurements of the resistivity that are processed as described below with reference to FIGS. 5A and 5B.

Those versed in the art would recognize that even with a substantially non-rotating sleeve on the drilling assembly, some rotation of the sleeve will occur. With a typical drilling rate of 60 feet per hour, in one minute, the tool assembly will advance one foot. With a typical rotary speed of 150 rpm, even a sleeve designed to be substantially non rotating could have a complete revolution in that one minute, providing for a complete overlap. Those versed in the art would also recognize that in an alternate disposition of the sensor that rotates with the drill bit, a complete overlap would occur in less than one second.

Figure 3G:
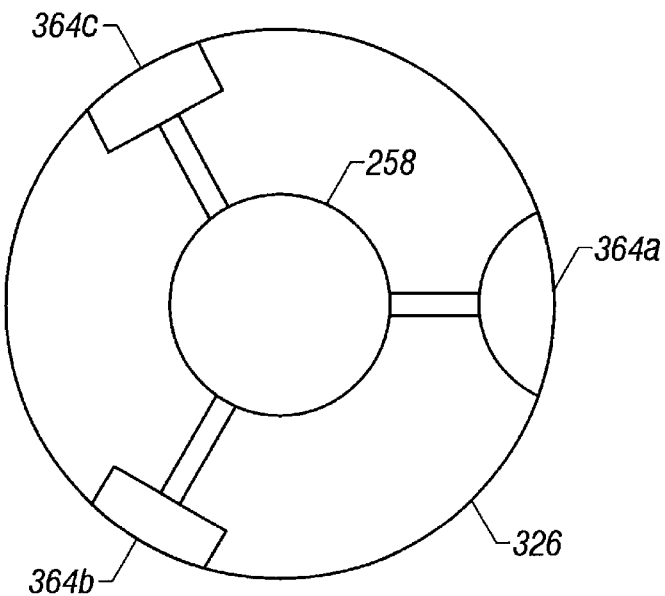
FIG. 3G illustrates an arrangement of density sensors according to the present invention.

FIG. 3G illustrates an arrangement of density sensors according to the present invention. Shown is a cross section of the borehole with the wall designated as 326 and the tool generally as 258. All pads are shown engaging the wall of the borehole. This arrangement is similar to that used in wireline tools except that in wireline tools, the source is located in the body of the tool.

Figure 3H:
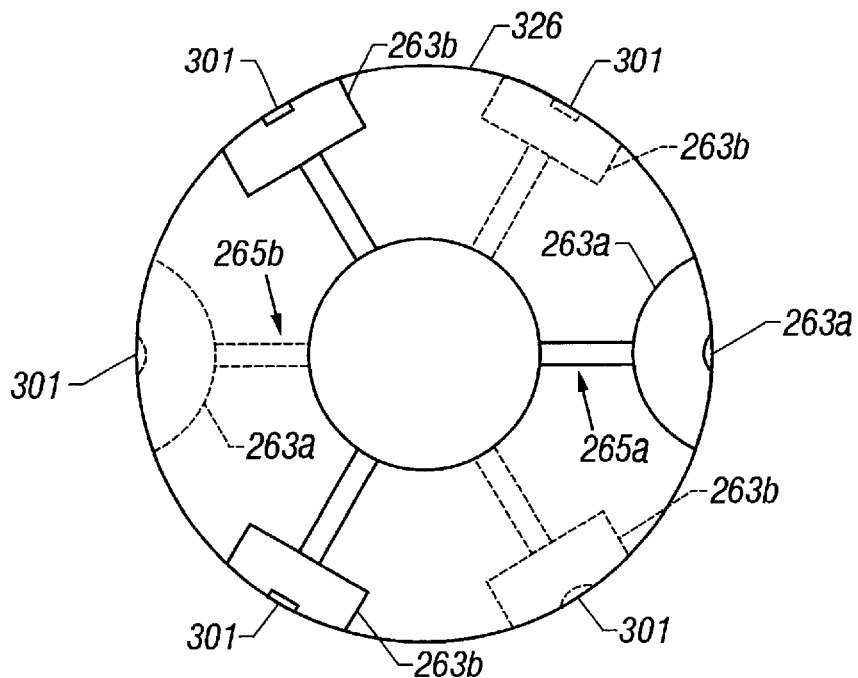
FIG. 3H illustrates an arrangement of offset density and neutron sensors according to the present invention.
Figure 3I:
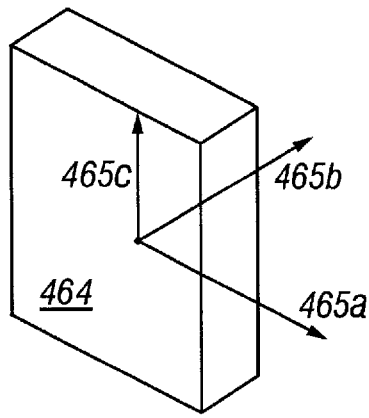
FIG. 3I illustrates the arrangement of elastic transducers on a pad.

FIG. 3H illustrates an arrangement of sensors according to the present invention such as described above and shown in FIG. 3C. Shown is a cross section of the borehole with the wall designated as 326 and the tool generally as 258. A first set 265a of ribs 263a and 263b are represented as shown with solid lines, and a second set 265b of ribs 263a and 263b are represented as shown with dashed lines. The first set 265a being offset with respect to the second set 265b. The offset of the ribs is preferably selected such that the sensors on the extendable ribs 263a are positioned toward opposite walls of the borehole 326. The pads are shown engaging the wall of the borehole.

The arrangements of FIGS. 3G and 3H illustrate a logging-while-sliding method according to the present invention. These embodiments, as those of FIGS. 3A–3C above enable continuous contact with the borehole wall as the drilling assembly traverses the formation. The sensors may be maintaining a substantially straight path alond the wall when the non-rotating sleeve is engaged (not rotating with the shaft). The sensors may also be traveling a helical path along the wall when the sleeve is disengaged (rotating with the shaft).

In an alternative arrangement the pads could have elastic (commonly referred to as acoustic) transducers mounted on them. In the simplest arrangement shown in FIG. 3I, each pad has a three component transducer (or, equivalently, three single component transducers) mounted thereon. The transducer is adapted to engage the borehole wall and capable of pulsating or vibrating motion in three directions, labeled as 465a, 465b and 465c. Those versed in the art would recognize that each of these excitations generates compression and shear waves into the formation. Synchronized motion of transducers on the plurality of pads introduces seismic pulses of different polarization into the formation that can be detected at other locations. In the simplest configuration, the detectors are located on the surface (not shown) and can be used for imaging the subsurface formations of the earth. Depending upon the direction of the pulses on the individual pads, compression and polarized shear waves are preferably radiated in different directions.

Figure 3J:
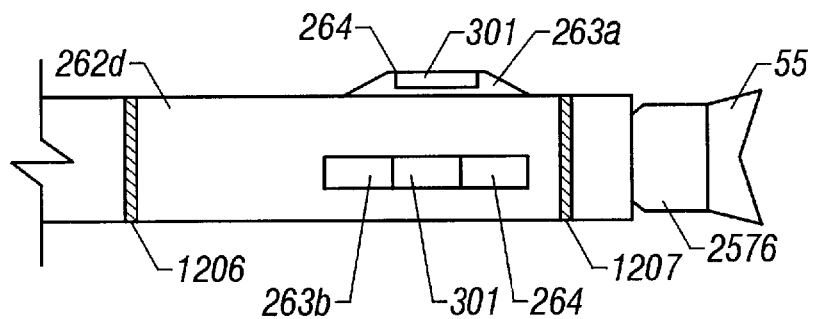
FIG. 3J shows an embodiment of the present invention wherein the drill bit is used as an electrode for resistivity measurements.

FIG. 3J illustrates an alternative embodiment having sensors on extendable ribs 263a coupled to a non rotating sleeve 262d. In this configuration the pads 264 are instrumented with resistivity or alternative sensors as described above. The drill bit 55 is adapted to function as an electrode to give a resistivity reading at the bit.

A current is driven by a known voltage through a toroid 1206. The current flowing in the toroid 1206 induces a voltage along the collar 2576. The voltage on the collar 2576 sets up current in the formation near the drill bit 55. The current flows through the formation, drill bit 55 and collar 2576. A receiver coil 1207, near the bottom of the tool measures the current flowing in the tool. Knowing the voltage, the bit resistivity is determined by measuring the current using methods described herein.

Referring now to FIG. 3K, the extendable ribs that contain the pad based sensors are housed within a drillstring subassembly 800. A single or multiple number of ribs 263a are contained within the body of this sub. Each rib contains a pad 264 mounted with a plurality of sensors 301. The sub 800 is conveyed downhole by drillpipe. At each end of the sub is a drillpipe compatible connection 1201. Each connection is adapted for the transfer of power and data between the sub and components of the LWD system located elsewhere in the drillstring. A power source external to sub 800 (not shown) is preferably used with this arrangement.

The extendable ribs extend on command from the external LWD assembly or from a microprocessor within the sub (not shown) as a response to the start of rotation or as a response to a command initiated independently of rotation. When rotation stops the ribs will retract back into the sub as a response to the cessation of rotation or as a response to a command initiated independently of rotation.

FIGS. 3L and 3M show a cross section through sub 800. FIG. 3L shows the extendable rib 263a with the pad 264 and sensors 301 extended to contact the borehole wall.

FIG. 3M shows the extendable rib retracted into the housing of the sub.

The orientation of the sensor packages on each extendable rib is referenced to a number of components (not shown) either within the sub or external to the sub in the LWD system that measure orientation and direction of the drilling assembly.

Figure 4:
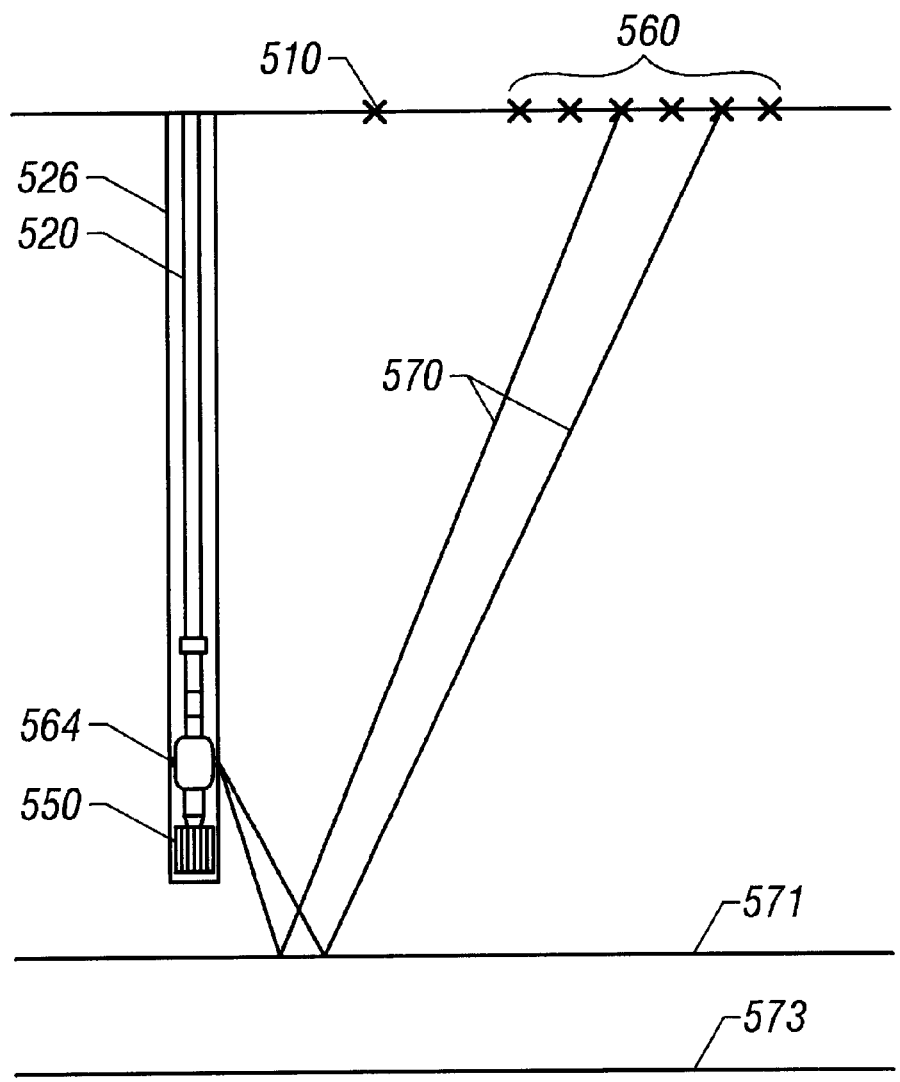
FIG. 4 illustrates the acquisition of a set of reverse VSP data according to the present invention.

FIG. 4 illustrates the acquisition of a set of reverse VSP data according to the present invention. A plurality of seismic detectors 560 are disposed at the surface 510. A borehole 526 drilled by a drill bit 550 at the end of a drillstring 520 is shown. The downhole drilling assembly includes seismic sources 564 on pads that engage the walls of the borehole. Seismic waves 570 radiating from the sources 564 are reflected by boundaries such as 571 and 573 and detected at the surface by the detectors 560. The detection of these at the surface for different depths of the drilling assembly gives what is called a reverse Vertical Seismic Profile (VSP) and is a powerful method of imaging formations ahead of the drill bit. Processing of the data according to known methods gives a seismic image of the subsurface. While reverse VSPs using the drill bit itself as a seismic source have been used in the past, results are generally not satisfactory due to a lack of knowledge of the characteristics of the seismic signal and due to poor S/N ratio. The present invention, in which the source is well characterized and is in essentially the same position on a non-rotating sleeve has the ability to improve the S/N ratio considerably by repeatedly exciting the sources in essentially the same position. Those versed in the seismic art would be familiar with the pattern of energy radiated into the formation by the different directions of motions of the transducers 465 and their arrangement on a circular array of pads.

Those versed in the art would also recognize that instead of seismic pulses, the seismic transmitters could also generate swept-frequency signals that continuously sweep through a selected range of frequencies. The signals recorded at the transmitters can be correlated with the swept frequency signal using well known techniques to produce a response equivalent to that of an impulsive seismic source. Such an arrangement requires less power for the transmitters and is intended to be within the scope of the invention.

The VSP configuration could be reversed to that of a conventional VSP, so that downhole sensors on a non-rotating sleeve measure seismic signals from a plurality of surface source positions. Such an arrangement would suffer from the disadvantage that a considerably greater amount of data would have to be transmitted uphole by telemetry.

In an alternate arrangement (not shown), two sets of axially spaced-apart pads are provided on the non-rotating sleeve. The second set of pads is not illustrated but it has an arrangement of detectors that measure three components of motion similar to the excitation produced by the sources 465. Those versed in the art would recognize that this gives the ability to measure compressional and shear velocities of the formation between the source and the receiver. In particular, because of the ability to directly couple a seismic source to the borehole wall, shear waves of different polarization can be generated and detected. Those versed in the art would know that in an anisotropic formation, two different shear waves with different polarization and velocity can be propagated (called the fast and the slow shear wave). Measurement of the fast and slow shear velocities gives information about fracturing of the formation and would be familiar to those versed in methods of processing the data to obtain this fracturing information.

The same arrangement of having seismic transmitters and receivers on non-rotating pads in the drilling assembly makes it possible to record reflections from surfaces in the vicinity of the borehole. In particular, it enables the device to obtain distances to seismic reflectors in the vicinity of the borehole. This information is useful in looking ahead of the drillbit and in guiding the drillbit where it is desired to follow a particular geologic formation.

Those versed in the art would recognize that by having an arrangement with four electrodes substantially in a linear arrangement on a number of non-rotating pads, the outer electrodes being a transmitter and a receiver respectively, and by measuring the potential difference between the inner electrodes, a resistivity measurement of the formation can be obtained. Such an arrangement is considered to be conventional in wireline logging applications but has hitherto not been used in measurement-while-drilling applications because of the difficulty in aligning the electrodes on a rotating drillstring.

The embodiments of the present invention discussed above include various sensors located on a non-rotating sleeve that is part of a drilling assembly which includes a downhole mud motor. Those versed in the art would recognize that an equivalent arrangement can be implemented wherein instead of a drillstring, coiled tubing is used. This arrangement is intended to be within the scope of the present invention.

Figure 5A:
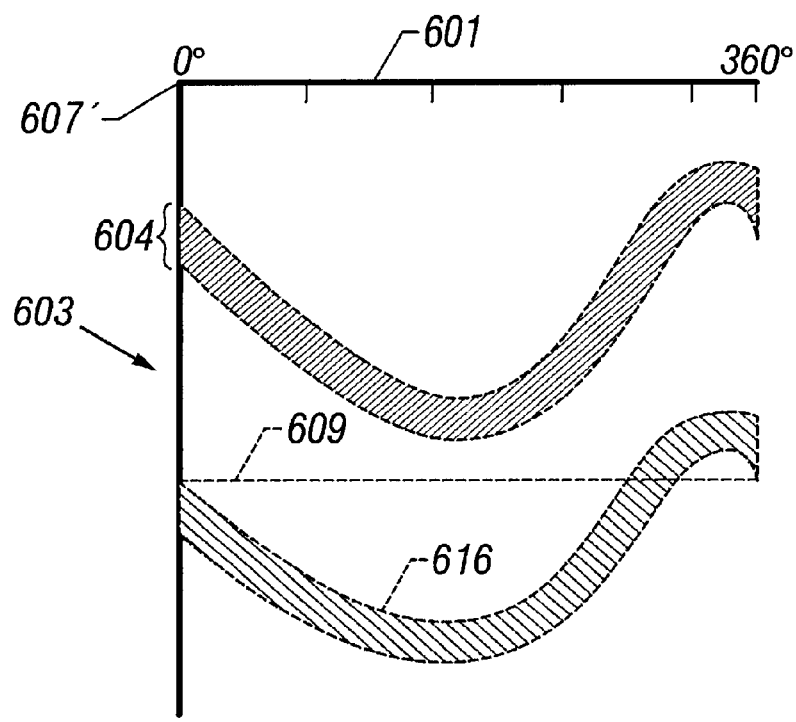
FIGS. 5A–5B show a method by which depth is calculated downhole..
Figure 5B:
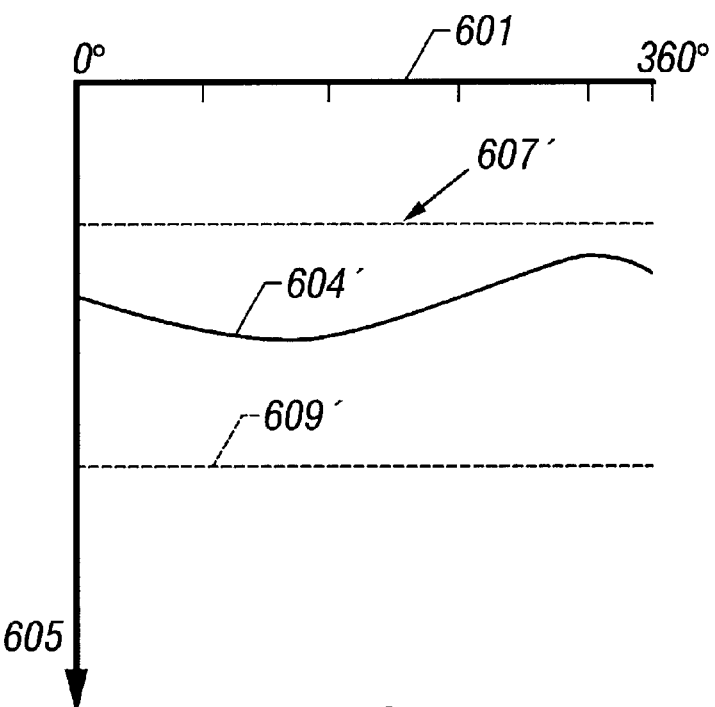

In an alternate embodiment of the invention, the formation sensor assembly could be directly mounted on the rotating drillstring without detracting from its effectiveness. This was discussed above with respect to resistivity sensors in FIG. 3D The method of processing of the acquired data from any one of these arrangements of formation sensors is discussed with reference to FIGS. 5A–5B. For illustrative purposes, FIG. 5A illustrates the "unwrapped" resistivity data that might be recorded by a first resistivity sensor rotating in a vertical borehole as the well is being drilled. The horizontal axis 601 has values from 0° to 360° corresponding to azimuthal angles from a reference direction determined by the directional sensor 271. The vertical axis 603 is the time of measurement. As the resistivity sensor rotates in the borehole while it is moved along with the drill bit, it traces out a spiral path. Indicated in FIG. 5A is a sinusoidal band 604 corresponding to, say, a bed of high resistivity intersecting the borehole at a dipping angle.

In one embodiment of the invention, the downhole processor 272 uses the depth information from downhole telemetry available to the telemetry device 286 and sums all the data within a specified depth and azimuth sampling interval to improve the S/N ratio and to reduce the amount of data to be stored. A typical depth sampling interval would be one inch and a typical azimuthal sampling interval is 15°. Another method of reducing the amount of data stored would be to discard redundant samples within the depth and azimuth sampling interval. Those versed in the art would recognize that a 2-D filtering of the data set by known techniques could be carried out prior to the data reduction. The data after this reduction step is displayed on a depth scale in FIG. 5B where the vertical axis 605 is now depth and the horizontal axis 601 is still the azimuthal angle with respect to a reference direction. The dipping resistive bed position is indicated by the sinusoid 604'. Such a depth image can be obtained from a time image if times such as 607 and 609, the absolute depth of the resistivity sensor, 607' and 609' were known.

As a backup or as a substitute for communicating depth information downhole, the microprocessor uses data from the additional resistivity sensors on the pads to determine a rate of penetration during the drilling. This is illustrated in FIG. 5A by a second resistivity band 616 corresponding to the same dipping band 604 as measured at a second resistivity sensor directly above the first resistivity sensor. The spacing between the first and second resistivity sensors being known, a rate of penetration is computed by the microprocessor by measuring the time shift between the bands 604 and 616. The time shift between the bands 604 and 606 could be determined by one of many methods, including cross-correlation techniques. This knowledge of the rate of penetration serves as a check on the depth information communicated downhole and, in the absence of the downhole telemetry data, can be used by itself to calculate the depth of the sensors.

The method of processing discussed above works equally well for resistivity measurements made by sensors on a non-rotating sleeve. As noted above with reference to FIG. 3B, there is still a slow rotation of the sensors that provides redundancy that can be utilized by the processor 272 as part of its processing-before-transmission.

Figure 6A:
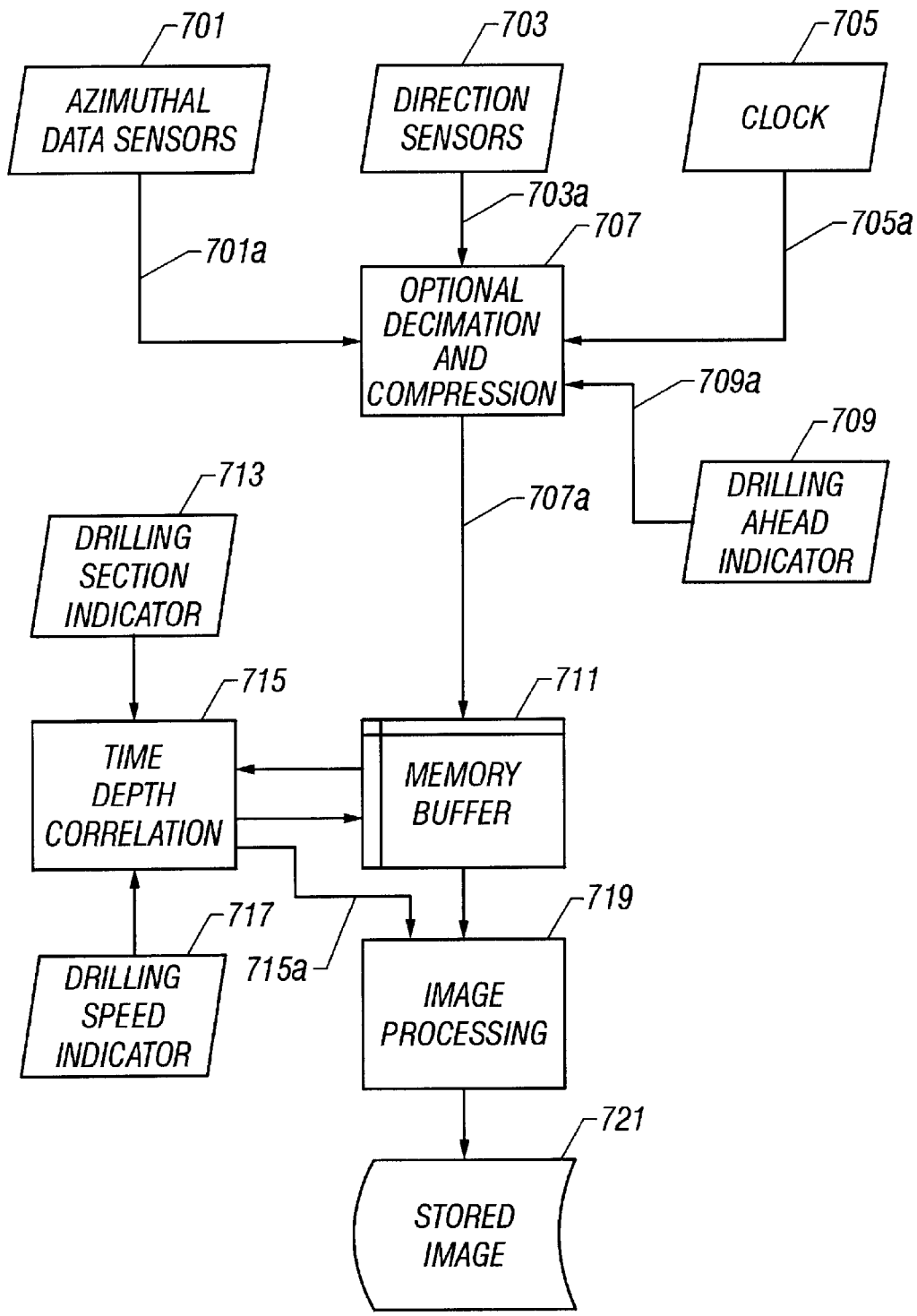
FIGS. 6A and 6B are schematic illustrations of the sequence of data flow in processing the data.

FIG. 6A illustrates the flow of data in one embodiment of the invention. The plurality of azimuthal data sensors (301 in FIG. 3A) are depicted at 701. The output 701a of the azimuthal data sensors 701 is azimuthal sensor data as a function of time. The direction sensors (271 in FIG. 2) are denoted at 703. The output 703a of the direction sensors 703 is the azimuth of the drilling assembly as a function of time. Using timing information 705a from a clock 705 and the information 709a from the drilling ahead indicator 709, the processor first carries out an optional data decimation and compression step at 707. The drilling ahead indicator uses a plurality of measurements to estimate the rate of advance of the drill bit. A sensor for measuring the weight on the drill bit gives measurements indicative of the rate of penetration: if the weight on the drill bit is zero, then the rate of penetration is also zero. Similarly, if the mud flow indicator indicates no flow of the mud, then too the drill bit is not advancing. Vibration sensors on the drill bit also give signals indicative of the forward movement of the drill bit. A zero value for weight on the drill bit, mud flow or drill bit vibration means that the sensor assembly is at a constant depth.

This step of data decimation and compression may stack data from multiple rotations of the sensor assembly that fall within a predetermined resolution required in the imaging of the data. This information 707a consisting of data as a function of azimuth and depth is stored in a memory buffer 711. A memory buffer with 16 MByte size is used, adequate to store the data acquired using one segment of drill pipe. As would be known to those versed in the art, the drill pipe comes in segments of 30 feet, successive segments being added at the wellhead as drilling progresses.

Using estimates of the drilling speed from 717, and a drilling section completed indicator 713 a depth—time correlation is performed 715. The drilling section completed indicator includes such information as the number of drill string segments. The drilling rate estimate is obtained, e.g., from the method given in the discussion of FIGS. 5A and 5B above. The time—depth transformation function 715a obtained by this is used at 719 to process the data as a function of azimuth and time in the memory buffer 711 to give an image that is a function of azimuth and depth. This image is stored downhole at 721 in a memory buffer. With 16 Mbytes of memory, it is possible to store 1700 feet of data downhole with a 1 inch resolution. This data is later retrieved when tripping the well or could be transmitted uphole using the telemetry device 286. By processing the data downhole in this fashion, the demand on the telemetry device is greatly reduced and it can be used for transmitting other data relating to the drilling motor and the drill bit uphole.

Figure 6B:
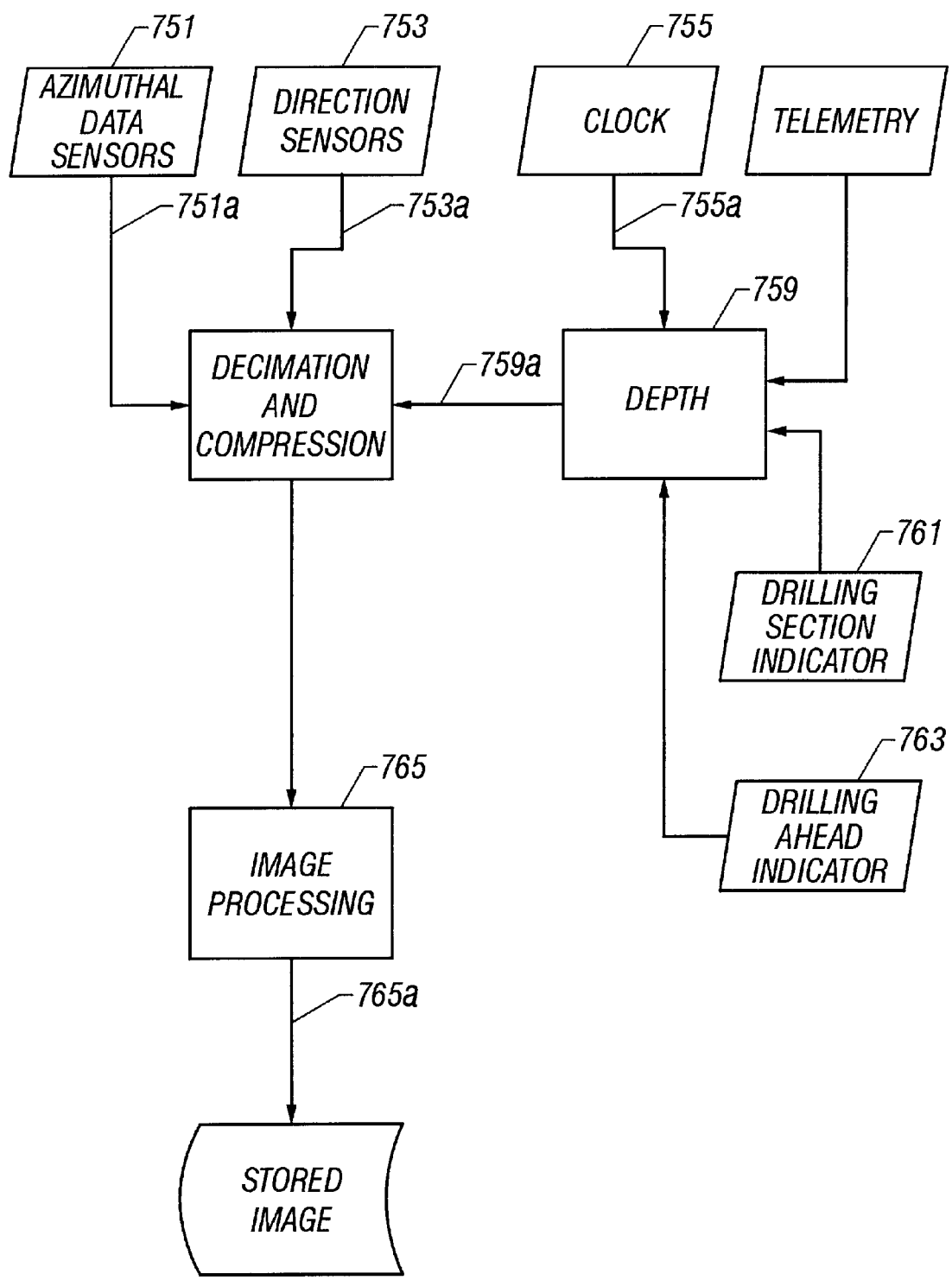

The arrangement shown in FIG. 6A does not use any telemetry data from the surface to compute depth. In an alternate arrangement shown in FIG. 6B, a depth calculation is performed downhole at 759 to give an actual position of the sensor assembly using information from a number of sources including telemetry data. One is the timing information 755a from the clock 755. A drilling speed sensor gives an indication of the drilling speed. Drilling speed 756a is obtained from one of two sources 756. In one embodiment, a downhole inertial sensor (not shown) is initialized each time that drilling is stopped for adding a section of drill pipe. The information from this inertial sensor provides an indication of drilling speed. In addition, or as an alternative, drilling speed transmitted from the surface by the downlink telemetry could be used and received at the downhole telemetry device 286 is used.

An indicator of the drilling section completed 761, as discussed above with reference to 713 in FIG. 6A is used as an additional input for the depth calculations, as is an estimate from the drilling ahead indicator 763, discussed above with reference to 709 in FIG. 6A. This depth calculation 759a is used in data compression and decimation 757 (as discussed above with reference to FIG. 6A) to process data 751a from the azimuthal measurement sensors 751 and the data 753a orientation sensors 753. The image processing at 765 gives the image data as a function of depth 765a, this data being stored downhole 767 with the same resolution as at 721 in FIG. 6A. The processing scheme of FIG. 6B does not require the memory buffer 711 that is present in FIG. 6A; however, it does require more depth data to be transmitted downhole, thus tying up the telemetry link to some extent.

As noted above in the discussion of FIGS. 5A–5B, a combination of both methods could also be used, i.e. perform depth calculations from sensor data downhole in addition to using downlinked data.

The discussion above was with respect to resistivity measurements. Any other scalar measurement made by a sensor can be treated in the same fashion to improve the S/N ratio prior to transmitting it uphole by telemetry. Vector data, such as acquired by compressional and shear wave transducers requires somewhat more complicated processing that would be known to those versed in the art.

As mentioned above, the data transmitted from downhole is indicative of resistivities at uniformly sampled depths of layers of the formation. The data is transmitted in real time. The processes and apparatus described above provide a relatively high resolution color image of the formation in real-time. The resolution of this image may be enhanced even further by using various image enhancement algorithms. These image enhancing algorithms would be familiar to those versed in the art.

The foregoing description has been limited to specific embodiments of this invention. It will be apparent, however, that variations and modifications may be made to the disclosed embodiments, with the attainment of some or all of the advantages of the invention. In particular, the invention may be modified to make density and acoustic measurements. Therefore, it is the object of the appended claims to cover all such variations and modifications as come within the true spirit and scope of the invention.

What is claimed is:

1. A formation evaluation apparatus mounted on a drilling assembly including a drill bit for drilling a borehole in a formation, the apparatus being useful for determining a parameter of interest of the formation surrounding a borehole having a longitudinal axis created by the drilling assembly, the apparatus comprising:

(a) a rotatable housing;
(b) at least one selectable member on the outside of the housing, the member being a rotating member when not selected and a substantially non-rotating when selected; and
(c) at least one rib set mounted on the selectable member, the rib set comprising at least one selectively extendable rib having a first pad coupled thereto for making contact with the formation when the extendable rib is extended and a first formation evaluation sensor operatively coupled to the first pad for making a first measurement relating to the parameter of interest of the formation, the contact being substantially continuous as the first formation evaluation sensor traverses the formation, and at least one fixed rib having a second pad coupled thereto for making contact with the formation, wherein said extendable rib and said at least one fixed rib are mounted on the selectable member at substantially the same distance along the longitudinal axis of the selectable member.

2. The apparatus of claim 1 further comprising a processor disposed in the housing, the processor using directional information from a directional sensor operably coupled to the housing and the measurement from the first formation evaluation sensors to determine the parameter of interest.

3. The apparatus of claim 2, wherein the parameter of interest is a resistivity image of the borehole.

4. The apparatus of claim 1 wherein the drilling assembly is conveyed on a drilling tubular selected from: (i) a jointed pipe, and (ii) coiled tubing.

5. The apparatus of claim 1 further comprising an extension device for moving the extendable rib from a retracted position to an extended position wherein the first pad makes contact with the formation.

6. The apparatus of claim 5, wherein the extension device is selected from a group consisting of: (i) hydraulically operated, (ii) spring operated, and (iii) electrically operated.

7. The apparatus of claim 1, wherein the at least one rib set is at least two rib sets comprising a first rib set and a second rib set, the first rib set further including a second formation evaluation sensor operatively coupled to the second pad for making a second measurement relating to the parameter of interest of the formation, and the second rib set having a further including a third formation evaluation sensor operatively coupled to a third pad for making a third measurement relating to the parameter of interest of the formation.

8. The apparatus of claim 7, wherein the first formation evaluation sensor is a resistivity sensor, the second formation evaluation sensor is a neutron sensor and the third formation evaluation sensor is a density sensor.

9. The apparatus of claim 1 further comprising a first toroid and a second toroid, each toroid being coupled to the selectable member, the first toroid for causing a current to flow through the formation and the drill bit, the second toroid being responsive to the current flowing through the drill bit, and a processor for determining the resistivity of the formation, the determination being based on the current in the second toroid.

10. The apparatus of claim 1, wherein the first pad is in contact with the formation and the member is not selected for sliding the first pad along the formation in a substantially helical path.

11. The apparatus of claim 1, wherein the first pad is in contact with the formation while the member is selected for sliding the first pad along the formation in a substantially straight path.

12. The apparatus of claim 1, wherein the at least one selectable member comprises at least two selectable members.

13. A formation evaluation apparatus mounted on a drilling assembly for determining a parameter of interest of a formation surrounding a borehole, said apparatus comprising:
(a) a rotatable housing;
(b) a directional sensor operably coupled to the housing for making measurements related to the orientation of the housing;
(c) a telemetry device disposed in the housing, said telemetry device adapted to receive depth information from an uphole controller;
(d) at least one selectively rotatable formation evaluation sensor operatively coupled to the housing and on the outside thereof, said at least one formation evaluation sensor in contact with the formation to make measurements related to the parameter of interest, said at least one formation evaluation sensor being selectively rotatable between a substantially non-rotating state and a rotating state, the formation evaluation sensor sliding along the formation in a substantially helical path as the drilling assembly traverses the formation when the at least one formation evaluation sensor is in the rotating state; and
(e) a processor for determining the parameter of interest from the measurements made by the directional sensor, the depth information and the measurements made by the at least one formation evaluation sensor.

14. The apparatus of claim 13, wherein the telemetry device is further adapted to transmit the determined parameter of interest to the uphole controller.

15. The apparatus of claim 13, wherein the drilling assembly is conveyed on a drilling tubular selected from: (i) a drillstring, and (ii) a coiled tubing.

16. The apparatus of claim 13 further comprising a selectable substantially non-rotating sleeve coupled to the housing, and wherein the at least one formation evaluation sensor is carried by the sleeve.

17. The apparatus of claim 13, further comprising at least one extendable rib selected from: (i) hydraulically operated, (ii) spring operated, and (iii) electrically operated.

18. The apparatus of claim 13, wherein the parameter of interest is selected from the set consisting of: (i) resistivity of the formation, (ii) density of the formation, (iii) compressional wave velocity of the formation, (iv) fast shear wave velocity of the formation, (v) slow shear wave velocity of the formation, (vi) dip of the formation, and (vii) radioactivity of the formation, and (viii) resistivity image of the borehole.

19. A method of determining a parameter of interest of a formation surrounding a borehole while drilling the borehole, comprising:
(a) conveying in the borehole a drilling assembly including a drillbit for drilling the borehole and a formation evaluation apparatus including a rotatable housing and at least one rib set mounted on said rotatable housing, the rib set comprising at least one selectively extendable rib having a first pad coupled thereto and at least one fixed rib having a second pad coupled thereto, wherein said extendable rib and said at least one fixed rib are mounted on the selectable member at substantially the same distance along the longitudinal axis of the selectable member;
(b) making measurements related to a parameter of interest of the formation with a formation evaluation sensor mounted on said extendable rib and placed in substantially continuous and sliding contact with the formation as the drilling assembly traverses the formation; and (c) processing the measurements from the formation evaluation sensor in a processor on the housing to determine the parameter of interest.

20. The method of claim 19 further comprising obtaining directional information from a directional sensor coupled to the housing and using the directional information in the processor.

21. The method of claim 20, wherein the processing includes computing a rate of penetration of the drilling tool.

22. The method of claim 20, wherein the parameter of interest is a resistivity image of the borehole.

23. The method of claim 19, wherein the drilling assembly is conveyed on a drilling tubular selected from: (i) a drillstring, and (ii) coiled tubing.

24. The method of claim 19 further comprising operating an extension device for moving the first pad from a retracted position to an extended position wherein the first pad makes contact with the formation, said extension device selected from the group consisting of: (i) hydraulically operated, (ii) spring operated, and (iii) electrically operated.

* * * * *